United States Patent
Kawana et al.

(10) Patent No.: US 10,829,576 B2
(45) Date of Patent: Nov. 10, 2020

(54) LIQUID REPELLENT COMPOSITION, METHOD FOR ITS PRODUCTION, AND METHOD FOR PRODUCING OIL RESISTANT PAPER

(71) Applicant: AGC Inc., Chiyoda-ku (JP)

(72) Inventors: Junsuke Kawana, Chiyoda-ku (JP); Motohiro Takemura, Chiyoda-ku (JP); Eiji Morimoto, Chiyoda-ku (JP); Hiroyuki Hara, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 210 days.

(21) Appl. No.: 16/133,839

(22) Filed: Sep. 18, 2018

(65) Prior Publication Data

US 2019/0016840 A1    Jan. 17, 2019

Related U.S. Application Data

(63) Continuation of application No. PCT/JP2017/016602, filed on Apr. 26, 2017.

(30) Foreign Application Priority Data

Apr. 27, 2016    (JP) ................. 2016-089101

(51) Int. Cl.
| | |
|---|---|
| *D21H 19/20* | (2006.01) |
| *C08F 220/24* | (2006.01) |
| *C09D 133/16* | (2006.01) |
| *D21H 21/16* | (2006.01) |
| *C09D 133/26* | (2006.01) |
| *D21H 21/14* | (2006.01) |
| *C09D 5/00* | (2006.01) |
| *C08F 220/22* | (2006.01) |
| *D21H 19/58* | (2006.01) |
| *C09D 7/40* | (2018.01) |
| *D21H 17/37* | (2006.01) |

(52) U.S. Cl.
CPC .......... *C08F 220/24* (2013.01); *C08F 220/22* (2013.01); *C09D 5/00* (2013.01); *C09D 7/40* (2018.01); *C09D 133/16* (2013.01); *C09D 133/26* (2013.01); *D21H 17/37* (2013.01); *D21H 19/20* (2013.01); *D21H 19/58* (2013.01); *D21H 21/14* (2013.01); *D21H 21/16* (2013.01)

(58) Field of Classification Search
USPC ...................................... 162/164.7
See application file for complete search history.

(56) References Cited

U.S. PATENT DOCUMENTS

| | | |
|---|---|---|
| 5,346,949 A | 9/1994 | Fukazawa |
| 2011/0039975 A1 | 2/2011 | Hara et al. |
| 2012/0225300 A1 | 9/2012 | Kawana et al. |
| 2012/0259045 A1 | 10/2012 | Hirono et al. |
| 2015/0096699 A1 | 4/2015 | Uehara et al. |

FOREIGN PATENT DOCUMENTS

| | | |
|---|---|---|
| JP | 63-027585 | 2/1988 |
| JP | 06-049319 | 2/1994 |
| JP | 2001-098257 | 4/2001 |
| JP | 2013-217007 | 10/2013 |
| WO | WO 2009/057716 A1 | 5/2009 |
| WO | WO 2009/145234 A1 | 12/2009 |
| WO | WO 2011/027877 A1 | 3/2011 |
| WO | WO 2011/059039 A1 | 5/2011 |
| WO | WO 2011/078135 A1 | 6/2011 |
| WO | WO 2015/129634 A1 | 9/2015 |

OTHER PUBLICATIONS

JP 2013-217007, Uehara et al., machine translation, Oct. 2013.*
International Search Report dated Jun. 6, 2017 in PCT/JP2017/016602 filed Apr. 26, 2017 (with English Translation).

* cited by examiner

*Primary Examiner* — Mark Halpern
(74) *Attorney, Agent, or Firm* — Oblon, McClelland, Maier & Neustadt, L.L.P.

(57) ABSTRACT

To provide a liquid repellent composition whereby a treated article excellent in liquid repellency is obtainable, which is excellent in stability and does not have such a problem as an odor attributable to ammonia or an organic amine; a method for its production; and a method for producing oil resistant paper. The liquid repellent composition comprises a copolymer (A) having structural units derived from a monomer (a) represented by the formula $R^F$-Q-X—C(O)C(R)=CH$_2$ ($R^F$ is a C$_{4-6}$ perfluoroalkyl group, Q is a divalent hydrocarbon group that does not contain a fluorine atom; X is —O— or NH—, and R is a hydrogen atom, a methyl group or a chlorine atom) and structural units derived from a monomer (b) having an anionic group, alkali metal ions and an aqueous medium; wherein the mass average molecular weight of the copolymer (A) is at most 84,000; at least some of counterions to the anionic groups are alkali metal ions; and the molar ratio of alkali metal ions to anionic groups in the liquid repellent composition is from 0.6 to 1.29.

13 Claims, No Drawings

LIQUID REPELLENT COMPOSITION, METHOD FOR ITS PRODUCTION, AND METHOD FOR PRODUCING OIL RESISTANT PAPER

TECHNICAL FIELD

The present invention relates to a liquid repellent composition, a method for its production, and a method for producing oil resistant paper using the liquid repellent composition.

BACKGROUND ART

Oil resistant paper having a barrier property against oil is being used for food packaging containers, food packaging paper, etc. Oil resistant paper is produced by a method of applying or impregnating a liquid repellent composition to a paper substrate (external addition processing), or by a method of papermaking a pulp slurry having a liquid repellent composition added (internal addition processing).

As the liquid repellent composition, for example, the following (1) and (2) have been proposed.

(1) A water/oil resistant composition comprising a copolymer having structural units based on a monomer having a $C_{1-6}$ perfluoroalkyl group, structural units based on a monomer having a (poly)oxyalkylene group and structural units based on itaconic acid, and an aqueous medium, wherein at least a part of carboxy groups in the structural units based on itaconic acid forms an ammonium salt or an organic amine salt, and the mass average molecular weight of the copolymer is from 5,000 to 100,000 (Patent Document 1).

(2) A water/oil resistant composition having dispersed in an aqueous medium a copolymer having structural units based on a monomer having a $C_{1-6}$ perfluoroalkyl group, structural units based on a hydrophilic monomer and structural units based on a monomer having an anionic group, and having a mass average molecular weight of at least 100,000 (Patent Document 2).

PRIOR ART DOCUMENTS

Patent Documents

Patent Document 1: WO2009/057716
Patent Document 2: WO2011/027877

DISCLOSURE OF INVENTION

Technical Problem

However, the water/oil resistant composition of the above (1) has the following problems.

Since the mass average molecular weight of the copolymer is low, dispersibility in the aqueous medium, of the copolymer contained in the water/oil resistant composition, is poor, and stability of the water/oil resistant composition is poor. The oil resistant paper obtained by using the water/oil resistant composition with poor stability, tends to be uneven in oil resistance.

The water/oil resistant composition has an odor due to ammonia or an organic amine.

The water/oil resistant composition containing ammonia or an organic amine is not suitable for food packaging containers, food packaging paper, etc.

If the conversion to a salt of a carboxy group by ammonia or an organic amine is insufficient, the dispersibility of the copolymer contained in the water/oil resistant composition, and the stability of the water/oil resistant composition, tend to be lower.

Itaconic acid as a monomer having an anionic group is poor in polymerizability with other (meth)acrylate monomers, whereby residual monomers become impurities, and the water/oil resistant composition from which removal of the impurities is not sufficient, is not suitable for food packaging containers, food packaging paper, etc.

On the other hand, in the water/oil resistant composition of the above (2), by increasing the mass average molecular weight of the copolymer, the water resistance and the oil resistance are improved, but, nevertheless the oil resistance and/or the stability is insufficient.

The present invention is to provide a liquid repellent composition whereby it is possible to obtain a treated article such as oil resistant paper excellent in liquid repellency, the stability is excellent, and there is no problem due to ammonia or an organic amine; a method for its production; and a method for producing oil resistant paper which is excellent in oil resistance and has no unevenness in oil resistance, whereby there is no problem such as an odor due to ammonia or an organic amine.

Solution to Problems

The present invention has the following embodiments.
<1> A liquid repellent composition characterized by comprising a copolymer (A) having structural units based on a monomer (a) represented by the following formula (I) and structural units based on a monomer (b) having an anionic group and an ethylenically unsaturated double bond, alkali metal ions, and an aqueous medium, wherein the mass average molecular weight of the copolymer (A) is at most 84000, at least some of counterions to anionic groups, are alkali metal ions, the molar ratio of alkali metal ions in the liquid repellent composition to the anionic groups (alkali metal ions/anionic groups) is from 0.6 to 1.29, $$R^F\text{-}Q\text{-}X\text{—}C(O)C(R)\text{=}CH_2 \quad (I)$$

where $R^F$ is a $C_{4-6}$ perfluoroalkyl group, Q is a divalent organic group having no fluorine atom, X is —O— or NH—, R is a hydrogen atom, a methyl group or a chlorine atom.

<2> The liquid repellent composition according to <1>, wherein the copolymer (A) is particles having an average particle size of from 40 to 250 nm.

<3> The liquid repellent composition according to <1> or <2>, wherein in 100 mass % of all structural units in the copolymer (A), the proportion of structural units based on the monomer (a) is from 30 to 99 mass %, and the proportion of structural units based on the monomer (b) is from 1 to 50 mass %.

<4> The liquid repellent composition according to any one of <1> to <3>, wherein R in the formula (I) is a methyl group.

<5> The liquid repellent composition according to any one of <1> to <4>, wherein the anionic group which the monomer (b) has, is a carboxy group.

<6> The liquid repellent composition according to <5>, wherein the monomer (b) is (meth)acrylic acid.

<7> The liquid repellent composition according to any one of <1> to <6>, wherein the copolymer (A) further has structural units based on a monomer (c) represented by the following formula (II),

$$CH_2=C(R^1)\text{-}G\text{-}(R^2O)_q-R^3 \quad (II)$$

where $R^1$ is a hydrogen atom or a methyl group, $R^2$ is a $C_{2-4}$ alkylene group, or a $C_{2-3}$ alkylene group having some or all of hydrogen atoms are substituted by hydroxy groups, q is from 1.00 to 50.00, G is —C(O)O(CH$_2$)$_r$— or C(O)O (CH$_2$)$_t$—NHC(O)O— (where r is an integer of from 0 to 4, and t is an integer of from 1 to 4), and $R^3$ is a hydrogen atom, a methyl group, a (meth)acryloyl group or an allyl group.
<8> The liquid repellent composition according to <7>, wherein the copolymer (A) is composed solely of structural units based on the monomer (a), structural units based on the monomer (b) and structural units based on the monomer (c).
<9> The liquid repellent composition according to <7> or <8>, wherein at least one of the monomer (b) and the monomer (c) has an acryloyl group as a moiety having an ethylenically unsaturated double bond.
<10> The liquid repellent composition according to any one of <1> to <9>, which does not contain ammonia and an organic amine.
<11> A method for producing a liquid repellent composition as defined in any one of <1> to <10>, characterized by comprising
polymerizing monomers comprising a monomer (a) represented by the following formula (I), and a monomer (b) having an anionic group and an ethylenically unsaturated double bond in a polymerization medium, to obtain a solution of a copolymer (A),
mixing the solution of the copolymer (A), an alkali metal hydroxide and water, to convert at least a part of anionic groups in the copolymer (A) to a salt to obtain a dispersion of the copolymer (A), and
removing at least a part of the organic solvent from the dispersion of the copolymer (A), $$R^F\text{-}Q\text{-}X-C(O)C(R)=CH_2 \quad (I)$$

where $R^F$ is a $C_{4-6}$ perfluoroalkyl group, Q is a divalent organic group having no fluorine atom, X is —O— or NH—, and R is a hydrogen atom, a methyl group or a chlorine atom.
<12> The production method according to <11>, wherein the polymerization to obtain the copolymer (A) is conducted in the absence of a surfactant.
<13> A method for producing oil resistant paper, comprising applying or impregnating the liquid repellent composition as defined in any one of <1> to <10> to a paper substrate.
<14> A method for producing oil resistant paper, comprising papermaking a pulp slurry containing the liquid repellent composition as defined in any one of <1> to <10>.

Advantageous Effects of Invention

According to the liquid repellent composition of the present invention, it is possible to obtain a treated article excellent in liquid repellency. Further, the liquid repellent composition of the present invention is excellent in stability and free of a problem such as an odor due to ammonia or an organic amine. According to the method for producing a liquid repellent composition of the present invention, it is possible to obtain a liquid repellent composition whereby it is possible to obtain a treated article excellent in liquid repellency, the stability is excellent, and there is no problem such as an odor due to ammonia or an organic amine.

According to the method for producing oil resistant paper of the present invention, it is possible to produce oil resistant paper which is excellent in oil resistance, has no unevenness in oil resistance and has no problem due to ammonia or an organic amine.

DESCRIPTION OF EMBODIMENTS

In the present specification, the following terms have the following meanings, respectively.

A "structural unit" means a moiety derived from a monomer, which is formed by polymerization of the monomer. A structural unit may be a unit formed directly by a polymerization reaction of a monomer, or may be a unit having a part of such a unit converted to another structure by treating the polymer.

The "monomer component" is a mixture containing a monomer (a) and a monomer (b) to be described later, or in a case where monomers other than the monomer (a) and the monomer (b) are to be used, a mixture further containing such other monomers.

An "anionic group" means a group which becomes to have a negative charge when a counterion (cation) is dissociated, and there are an acid form where the counterion is a proton, and a salt form where the counterion is an alkali metal ion, an ammonium ion, etc.

A "polymerization medium" means a medium to be used to disperse or dissolve monomers at the time of conducting the polymerization.

An "aqueous medium" means a liquid medium containing water as the main component.

A "perfluoroalkyl group" means a group having all of hydrogen atoms of an alkyl group substituted by fluorine atoms.

A "(meth)acrylate" is a general term for an acrylate and a methacrylate.

A "(meth)acryloyl group" is a general term for an acryloyl group and a methacryloyl group.

The term "containing as the main component" means containing said component in an amount of at least 50 mass %.

The "mass average molecular weight of a copolymer" is a molecular weight as calculated as polymethyl methacrylate, measured by gel permeation chromatography (GPC).

An "average particle size" is calculated by a cumulant method analysis from an autocorrelation function obtained by a dynamic light scattering method with respect to a sample obtained by diluting a liquid repellent composition to a solid content concentration of 5 mass % with water.

The "molar ratio of alkali metal ions in a liquid repellent composition to anionic groups (alkali metal ions/anionic groups)" is a molar ratio calculated by the following formula, from the number of moles of structural units based on monomer (b) having an anionic group in the copolymer, and the number of moles of alkali metal hydroxide, used at the time of producing the liquid repellent composition.

Molar ratio of alkali metal ions in liquid repellent composition to anionic groups (alkali metal ions/anionic groups)=(the number of moles of alkali metal hydroxide)/(the number of moles of structural units based on monomer (b)×the number of anionic groups in monomer (b)× valence of anionic groups)

<Liquid Repellent Composition>

The liquid repellent composition of the present invention comprises the specific copolymer (A) as described later, alkali metal ions and an aqueous medium. The liquid repellent composition of the present invention may optionally contain, to such an extent not to impair the effects of the present invention, other components other than the copolymer (A), the alkali metal ions and the aqueous medium.
(Copolymer (A))

The copolymer (A) has structural units based on the later-described monomer (a) and structural units based on the later-described monomer (b). The copolymer (A) preferably further has structural units based on the later-described monomer (c).

The copolymer (A) may further have, as the case requires, structural units based on a monomer (d) other than structural units based on the monomer (a), structural units based on the monomer (b) and structural units based on the monomer (c). Particularly, it is preferred that the copolymer (A) is composed solely of structural units based on the monomer (a), structural units based on the monomer (b) and structural units based on the monomer (c).

Monomer (a):

The monomer (a) is a compound represented by the following formula (I).

$$R^F\text{-}Q\text{-}X\text{—}C(O)C(R)\text{=}CH_2 \quad (I)$$

As the copolymer (A) has structural units based on such (a), it is possible to impart liquid repellency to a treated article obtained by treating a substrate with the liquid repellent composition.

In the above formula (I), $R^F$ is a $C_{4-6}$ perfluoroalkyl group. $R^F$ is, from such a viewpoint that the liquid repellency of the treated article will be further excellent, particularly preferably a $C_6$ perfluoroalkyl group. $R^F$ may be linear or may be branched, but is preferably linear.

$R^F$ may be $F(CF_2)_4$—, $F(CF_2)_5$—, $F(CF_2)_6$—, $(CF_3)_2CF(CF_2)_2$—, etc.

Q is a divalent organic group having no fluorine atom. The divalent organic group is a divalent group containing carbon. The divalent organic group may be an alkylene group, or a group having —O—, —NH—, —CO—, —SO$_2$—, —S—, —CD$^1$=CD$^2$- (where D$^1$ and D$^2$ are each a hydrogen atom or a methyl group), etc., at a terminal on the $R^F$ side of an alkylene group or between carbon-carbon atoms of an alkylene group. The divalent organic group may be linear or may be branched.

Q includes the following groups, etc.
—CH$_2$—, —CH$_2$CH$_2$—, —(CH$_2$)$_3$—, —CH$_2$CH$_2$CH(CH$_3$)—, —CH=CH—CH$_2$—, —S—CH$_2$CH$_2$—, —SO$_2$—CH$_2$CH$_2$—, —CH$_2$CH$_2$CH$_2$—S—CH$_2$CH$_2$—, —CH$_2$CH$_2$CH$_2$—SO$_2$—CH$_2$CH$_2$—.

Q is preferably an alkylene group, more preferably —CH$_2$CH$_2$—.

X is —O— or NH—. As X, from the viewpoint of easy availability of the monomer (a), —O— is preferred.

R is a hydrogen atom, a methyl group or a chlorine atom. R is preferably a hydrogen atom or a methyl group, and from such a viewpoint that the stability of the liquid repellent composition and the liquid repellency of the treated article will be excellent, a methyl group is more preferred.

As specific examples of the monomer (a), the following compounds may be mentioned.
F(CF$_2$)$_6$CH$_2$CH$_2$OC(O)C(CH$_3$)=CH$_2$, F(CF$_2$)$_6$CH$_2$CH$_2$OC(O)CH=CH$_2$, F(CF$_2$)$_6$CH$_2$CH$_2$OC(O)C(Cl)=CH$_2$, F(CF$_2$)$_4$CH$_2$CH$_2$OC(O)C(CH$_3$)=CH$_2$, F(CF$_2$)$_4$CH$_2$CH$_2$OC(O)CH=CH$_2$, F(CF$_2$)$_4$CH$_2$CH$_2$OC(O)C(Cl)=CH$_2$.

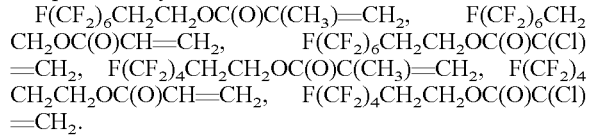

As the monomer (a), F(CF$_2$)$_6$CH$_2$CH$_2$OC(O)C(CH$_3$)=CH$_2$ is particularly preferred. As the monomer (a), one type may be used alone, or two or more types may be used in combination.

Monomer (b):

The monomer (b) is a monomer having an anionic group and an ethylenically unsaturated double bond.

In the present invention, at least some of counterions to the anionic groups, are alkali metal ions. As the copolymer (A) has structural units based on the monomer (b), dispersibility of the copolymer (A) contained in the liquid repellent composition becomes excellent, and the stability of the liquid repellent composition will be improved.

The anionic group may be a group having an acidic proton such as a carboxy group, a sulfo group, a phosphoric acid group, etc., or a salt thereof (but excluding an ammonium salt and an organic amine salt). As the anionic group, from the viewpoint of excellent fixability to a substrate, a carboxy group or a salt thereof is preferred, and a carboxy group is more preferred.

As the site having an ethylenically unsaturated double bond in the monomer, a double bond based on a (meth)acryloyl group, a (meth)acrylamide group, a vinyl group a (meth)allyl group, etc. may be mentioned. Among them, from the viewpoint of excellent copolymerizability with other monomers, preferred is a double bond based on a (meth)acryloyl group.

The monomer (b) having a carboxy group and an ethylenically unsaturated double bond may be (meth)acrylic acid, crotonic acid, maleic acid, fumaric acid, itaconic acid, citraconic acid, etc. The monomer (b) having a sulfo group may be vinyl sulfonic acid, (meth)allylsulfonic acid, styrenesulfonic acid, vinyl sulfonic acid, acrylamide tert-butyl sulfonic acid, etc.

As the monomer (b), from the viewpoint of further excellent liquid repellency of the treated article and excellent copolymerizability with other monomers, preferred is (meth)acrylic acid or a salt thereof. As the monomer (b), one type may be used alone, or two or more types may be used in combination.

Monomer (c):

The monomer (c) is a compound represented by the following formula (II).

$$CH_2\text{=}C(R^1)\text{-}G\text{-}(R^2O)_q\text{—}R^3 \quad (II)$$

As the copolymer (A) has structural units based on the monomer (c), dispersibility of the copolymer (A) contained the liquid repellent composition becomes better, and the stability of the liquid repellent composition will be further improved.

In the formula (II), $R^1$ is a hydrogen atom or a methyl group.

G is —C(O)O(CH$_2$)$_r$— or C(O)O(CH$_2$)$_t$—NHC(O)O— (where r is an integer of from 0 to 4, and t is an integer of from 1 to 4). As G, —C(O)O(CH$_2$)$_r$— is preferred.

$R^2$ is a $C_{2-4}$ alkylene group, or a $C_{2-3}$ alkylene group having some or all of hydrogen atoms substituted by hydroxyl groups. In one molecule, two or more alkylene groups different in the number of carbon atoms may be contained. Sequence of two or more oxyalkylene groups different in the number of carbon atoms may be a block form, or may be a random form. q is an integer when the number of oxyalkylene groups is a constant value, but in the case of a mixture where the number of oxyalkylene groups is not constant, it will be an average value thereof. q is from 1.00 to 50.00, preferably from 1.00 to 9.00, more preferably from 1.00 to 4.00, further preferably from 1.00 to 1.03.

$R^3$ is a hydrogen atom, a methyl group, a (meth)acryloyl group or an allyl group. As $R^3$, a hydrogen atom is preferred. The monomer (c) is preferably such that q is from 1.00 to 1.03, and $R^3$ is a hydrogen atom.

As specific examples of the monomer (c), the following compounds may be mentioned.

A hydroxyalkyl (meth)acrylate such as 2-hydroxyethyl (meth)acrylate, 2-hydroxypropyl (meth)acrylate, 2-hydroxybutyl (meth)acrylate, 4-hydroxybutyl (meth)acrylate, etc.; a polyoxyalkylene mono(meth)acrylate such as polyethylene glycol mono(meth)acrylate, polypropylene glycol mono(meth)acrylate, poly(oxyethylene-oxypropylene) mono(meth)acrylate, poly(oxyethylene-oxybutylene) mono(meth)acrylate, poly(oxyethylene-oxytetramethylene) mono(meth)acrylate, etc.; an alkoxypolyoxyalkylene (meth)acrylate such as methoxypolyethylene glycol (meth)acrylate, methoxypoly(oxyethylene-oxypropylene) mono(meth)acrylate, etc.; a polyalkylene di(meth)acrylate such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, poly(oxyethylene-oxypropylene) di(meth)acrylate, etc.

As the monomer (c), with a view to satisfying both the water-dispersibility and stability of the liquid repellent composition, and the liquid repellency of the treated article, hydroxyalkyl (meth)acrylates are preferred, and among them, 2-hydroxyethyl (meth)acrylate is particularly preferred. As the monomer (c), one type may be used alone, or two or more types may be used in combination.

Monomer (d):

The monomer (d) is another monomer other than the monomer (a), the monomer (b) and the monomer (c). As the monomer (d), an alkyl (meth)acrylate, a vinyl ether, an olefin, a halogenated olefin, an unsaturated carboxylic acid ester other than an alkyl (meth)acrylate, allyl acetate, an alkyl vinyl ketone, butadiene, isoprene, chloroprene, N-vinylpyrrolidone, N-vinylcarbazole, a maleimide, an acrylamide, an amino group-containing monomer, an isocyanato group-containing monomer, a blocked isocyanato group-containing monomer, an urethane monomer, an alkoxysilyl group-containing monomer, an epoxy group-containing monomer, an N-methylol group-containing monomer, an N-alkoxymethyl group-containing monomer, etc. may be mentioned.

Proportions of the Respective Structural Units:

In a case where the copolymer (A) contains structural units based on the monomer (a) and structural units based on the monomer (b) and does not contain structural units based on monomer (c), the proportions of the respective structural units are as follows.

The proportion of structural units based on the monomer (a) is preferably from 30 to 99 mass %, more preferably from 50 to 99 mass % in 100 mass % of all structural units in the copolymer (A). When the proportion is at least the lower limit value in the above range, the liquid repellency of the treated article will be more excellent. When the proportion is at most the upper limit value in the above range, the dispersibility of the copolymer (A) contained in the liquid repellent composition will be further improved, and the stability of the liquid repellent composition will be further improved.

The proportion of structural units based on the monomer (b) is preferably from 1 to 50 mass %, more preferably from 1 to 40 mass % in 100 mass % of all structural units in the copolymer (A). When the proportion is at least the lower limit value in the above range, the dispersibility of the copolymer (A) contained in the liquid repellent composition will be further improved, and the stability of the liquid repellent composition will be further improved. When the proportion is at most the upper limit value in the above range, the liquid repellency of the treated article will be more excellent.

The proportion of structural units based on the monomer (d) is preferably from 0 to 30 mass %, more preferably from 0 to 10 mass %, in 100 mass % of all structural units in the copolymer (A). When the proportion is at most the upper limit value in the above range, the effect of the present invention will not be impaired. It is most preferred that the copolymer (A) does not contain structural units based on the monomer (d).

In a case where the copolymer (A) contains structural units based on the monomer (a), structural units based on the monomer (b) and structural units based on the monomer (c), the proportions of the respective structural units are as follows.

The proportion of structural units based on the monomer (a) is preferably from 30 to 98 mass %, more preferably from 50 to 98 mass %, most preferably from 72 to 82 mass %, in 100 mass % of all structural units in the copolymer (A). When the proportion is within the range, the liquid repellency of the treated article and the stability of the liquid repellent composition will be excellent.

The proportion of structural units based on the monomer (b) is preferably from 1 to 50 mass %, more preferably from 1 to 30 mass % in 100 mass % of all structural units in the copolymer (A). When the proportion is within the above range, the liquid repellency of the treated article and the stability of the liquid repellent composition will be excellent.

The proportion of structural units based on the monomer (c) is preferably from 1 to 50 mass %, more preferably from 1 to 30 mass %, in 100 mass % of all structural units in the copolymer (A). When the proportion is at least the lower limit value in the above range, the dispersibility of the copolymer (A) contained in the liquid repellent composition will be further improved, and the stability of the liquid repellent composition will be further improved. When the proportion is at most the upper limit value in the above range, the liquid repellency of the treated article will be more excellent.

The proportion of structural units based on the monomer (d) is preferably from 0 to 30 mass %, more preferably from 0 to 10 mass %, in 100 mass % of all structural units in the copolymer (A). When the proportion is at most the upper limit value in the above range, the effect of the present invention will not be impaired. It is most preferred that the copolymer (A) does not contain structural units based on the monomer (d).

The copolymer (A) is preferably composed solely of structural units based on the monomer (a), structural units based on the monomer (b) and structural units based on the monomer (c). Further, in each of the monomer (a), the monomer (b) and monomer (c), a moiety having an ethylenically unsaturated double bond in the monomer is preferably a (meth)acryloyl group. Furthermore, such a moiety is preferably a methacryloyl group in the monomer (a), and is preferably an acryloyl group in at least one of the monomer (b) and the monomer (c).

The proportion of structural units based on a monomer is obtained from the NMR analysis and elemental analysis. Further, it may be calculated on the basis of the charged amount of the monomer at the time of the production of the copolymer (A).

Mass Average Molecular Weight:

The mass average molecular weight of the copolymer (A) is at most 84,000, preferably from 10,000 to 84,000, more preferably from 20,000 to 84,000, most preferably from 30,000 to 84,000. When the mass average molecular weight is at least the lower limit value in the above range, the dispersibility of the copolymer (A) contained in the liquid repellent composition will be further improved, and the stability of the liquid repellent composition will be further improved. When the mass average molecular weight is at most the upper limit value in the above range, the stability of the liquid repellent composition will be excellent.

Average Particle Size:

In the liquid repellent composition of the present invention, the copolymer (A) is preferably dispersed as particles in the aqueous medium.

The average particle size of the copolymer (A) in the liquid repellent composition is preferably from 40 to 250 nm, more preferably from 50 to 200 nm. When the average particle size is at least the lower limit value in the above range, the liquid repellency of the treated article will be more excellent. When the average particle size is at most the upper limit value in the above range, the dispersibility of the copolymer (A) contained in the liquid repellent composition will be further improved, and the stability of the liquid repellent composition will be further improved.

(Aqueous Medium)

The aqueous medium is a liquid medium containing water as the main component. The proportion of water in the aqueous medium is preferably at least 60 mass %, more preferably at least 90 mass %, most preferably at least 95 mass %. The aqueous medium may contain an organic solvent whereby water can form an azeotropic mixture.

The organic solvent whereby water can form an azeotropic mixture, is preferably propylene glycol, propylene glycol monomethyl ether, dipropylene glycol monomethyl ether, dipropylene glycol, tripropylene glycol, diacetone alcohol, methanol, ethanol, propanol, acetone, or methyl ethyl ketone.

(Alkali Metal Ions)

The liquid repellent composition of the present invention contains alkali metal ions. In the liquid repellent composition, an alkali metal ion forms a salt with an anionic group in the copolymer (A), and thus contributes to the dispersion stability of the fluorinated copolymer (A).

Alkali metal ions may be at most equivalent or at least equivalent, to anionic groups. The molar ratio of alkali metal ions in the liquid repellent composition to anionic groups (alkali metal ions/anionic groups) is from 0.6 to 1.29, preferably from 0.7 to 1.2, more preferably from 0.7 to 1.1. When the molar ratio is within the above range, the copolymer (A) contained in the liquid repellent composition is less likely to cause precipitation due to poor dispersion or ester hydrolysis due to alkali and can be stably present in the aqueous medium.

(Other Components)

The liquid repellent composition of the present invention may contain known additives as other components.

As the additives, a sizing agent, a resin other than the copolymer (A), a crosslinking agent, a catalyst, an organic filler, an inorganic filler, a supporting agent, a moisturizing agent, a flocculant, a buffer, a bactericide, a biocide, a fungicide, an antibacterial agent, a sequestering agent, a hydrophobizing agent, a surfactant, a defoamer, a volatile organic solvent, etc. may be mentioned.

It is preferred that the liquid repellent composition of the present invention does not contain ammonia, an organic amine, and salts thereof.

(Composition of Liquid Repellent Composition)

In the liquid repellent composition of the present invention, the mass ratio of the copolymer (A) to the aqueous medium (copolymer (A)/aqueous medium) is preferably from 10 to 60/from 90 to 40, more preferably from 10 to 50/from 90 to 50. The solid content concentration in the liquid repellent composition of the present invention is preferably from 10 to 60 mass %, preferably from 10 to 50 mass %. The solid content concentration is the concentration of solid contents such as the copolymer (A), additives, etc. in the liquid repellent composition.

The content of other components in the liquid repellent composition is preferably from 0 to 20 parts by mass, more preferably from 0 to 10 parts by mass, to 100 parts by mass of the copolymer (A).

The pH of the liquid repellent composition of the present invention is preferably from 7 to 12, more preferably from 7 to 11. When the pH of the liquid repellent composition is within the above range, the copolymer (A) will be less likely to cause precipitation due to poor dispersion or ester hydrolysis due to alkali, and the stability of liquid repellent composition will be excellent.

The liquid repellent composition of the present invention is preferably one with less foaming. Specifically, it is preferred that the defoaming property parameter measured on the basis of the following defoaming test method α is at most 500 mL. When the defoaming property parameter is at most the upper limit value in the above range, foaming of the liquid repellent composition of the present invention will be less.

Defoaming test method α: A method for conducting the following steps α1 to α7 sequentially by means of a continuous foaming tester equipped with a measuring cylinder having an inner diameter of 65 mm, a temperature control system to maintain an aqueous dispersion test liquid obtained by diluting the liquid repellent composition of the present invention with water so that the concentration of the copolymer (A) would be 0.1 mass %, at a constant temperature, a nozzle with an inner diameter of 9 mm disposed so that the forward end would be directed downward at the position where the height from the bottom of the above measuring cylinder is of 420 mm, and an aqueous dispersion test liquid circulation system to circulate said aqueous dispersion test solution at a flow rate of 11.5 L/min, by letting said aqueous dispersion test solution be withdrawn from the vicinity of a bottom surface of the above measuring cylinder and ejected from said nozzle, whereupon the foam volume (mL) obtained in step α7 is adopted as the defoaming property parameter.

Step α1: A step of letting the measuring cylinder containing 650 mL of the water dispersion test liquid stand still until the aqueous dispersion test solution becomes to be 18° C. by the temperature control system.

Step α2: A step of conducting circulation by the water dispersion test liquid circulation system for 30 seconds.

Step α3: A step of stopping circulation by the water dispersion test liquid circulation system for 30 seconds.

Step α4: A step of conducting circulation by the water dispersion test liquid circulation system for 120 seconds.

Step α5: A step of stopping circulation by the water dispersion test liquid circulation system for 60 seconds.

Step α6: A step of conducting circulation by the water dispersion test liquid circulation system for 300 seconds.

Step α7: A step of stopping circulation by the water dispersion test liquid circulation system and measuring the foam volume (mL) above the liquid surface of the aqueous dispersion test liquid after 60 seconds from the stopping.

By the liquid repellent composition of the present invention as described above, since it has structural units based on the monomer (a), it is possible to obtain a treated article excellent in liquid repellency. Further, the liquid repellent composition of the present invention as described above is excellent in stability, since it has structural units based on the monomer (b), the molar ratio of alkali metal ions/anionic groups is from 0.6 to 1.29, and the mass average molecular weight of the copolymer is at most 84,000.

Further, in the liquid repellent composition of the present invention, since the counterions (except protons) to the anionic groups are alkali metal ions, ammonia or an organic amine is not used for conversion of anionic groups to a salt, and there will be no problem due to ammonia or an organic amine.

<Method for Producing Liquid Repellent Composition>

The method for producing a liquid repellent composition of the present invention has the following steps (i) to (iv).

Step (i): A step of polymerizing a monomer component comprising a monomer (a) and a monomer (b), and, as the case requires, a monomer (c) and a monomer (d) in a polymerization medium containing an organic solvent, to obtain a solution of a copolymer (A).

Step (ii): A step of mixing the solution of the copolymer (A) with an alkali metal hydroxide and water, to convert at least a part of anionic groups in the copolymer (A) to a salt, to obtain a dispersion of the copolymer (A).

Step (iii): A step of removing at least a part of the organic solvent from the dispersion of the copolymer (A), to obtain a liquid repellent composition having the copolymer (A) dispersed in an aqueous medium.

Step (iv): A step of adding other components or diluting with e.g. an aqueous medium, as the case requires.

(Step (i))

As the polymerization method, a solution polymerization method, a suspension polymerization method, an emulsion polymerization method, etc. may be mentioned; a solution polymerization method or a suspension polymerization method is preferred; and from the viewpoint of polymerization stability, a solution polymerization method is more preferred.

For the polymerization, in a polymerization medium, the monomer component is polymerized in the presence of a polymerization initiator or a chain transfer agent, as the case requires. The polymerization medium preferably contains an organic solvent and is more preferably an organic solvent. At the time of the polymerization, it is preferred to carry out the polymerization in the absence of a surfactant i.e. without using a surfactant.

As examples of the organic solvent, the following compounds may be mentioned.

A ketone (acetone, methyl ethyl ketone, methyl isobutyl ketone, etc.), an alcohol (isopropyl alcohol, etc.), diacetone alcohol, an ester (ethyl acetate, butyl acetate, etc.), an ether (diisopropyl ether, etc.), an aliphatic hydrocarbon, an aromatic hydrocarbon, a halogenated hydrocarbon (perchloroethylene, trichloro-1,1,1-ethane, trichlorotrifluoroethane, dichloropentafluoropropane, etc.), N,N-dimethylformamide, N-methyl-pyrrolidone-2, butylacetone, dimethyl sulfoxide, glycol ether, etc. As the organic solvent, one type may be used alone, or two or more types may be used in combination.

As the organic solvent, from the viewpoint of operation efficiency in step (iii), a relatively low-boiling organic solvent, or an organic solvent capable of forming an azeotrope with water is preferred.

As the relatively low-boiling organic solvent, one having a boiling point of at most 80° C. is preferred. Specifically, acetone, methanol, ethanol, etc. may be mentioned. As the organic solvent capable of forming an azeotrope with water, acetone, methanol, ethanol, 2-propyl alcohol, methyl isobutyl ketone, methyl ethyl ketone, or a mixed solvent thereof may be mentioned.

As the polymerization initiator, ammonium persulfate, potassium persulfate, a peroxide (benzyl peroxide, lauryl peroxide, succinyl peroxide, tert-butyl peroxypivalate, etc.), an azo compound, etc. may be mentioned.

As the chain transfer agent, an alkyl mercaptan (tert-dodecyl mercaptan, n-dodecyl mercaptan, stearyl mercaptan, etc.), aminoethanethiol, mercaptoethanol, thioglycolic acid, 2-mercaptopropionic acid, 2,4-diphenyl-4-methyl-1-pentene, may be mentioned. In order to reduce a low molecular oligomer component with a low polymerization degree, in the present invention, it is preferred to adjust the molecular weight without using a chain transfer agent.

The proportions of the respective monomers in the monomer component correspond to the proportions of the respective structural units in the copolymer (A) as described above, and their preferred ranges are also the same. The concentration of the monomer component is preferably from 5 to 70 mass %, more preferably from 10 to 60 mass %, in 100 mass % of all raw materials (including the organic solvent). The amount of the polymerization initiator is preferably from 0.1 to 2.0 parts by mass, to 100 parts by mass of the monomer component. The amount of the chain transfer agent is preferably from 0 to 1 part by mass, most preferably 0 part by mass, to 100 parts by mass of the monomer component, i.e. it is most preferred not to use a chain transfer agent.

The polymerization temperature is preferably in a range of from room temperature to the boiling point of the organic solution, and from the viewpoint of using the polymerization initiator efficiency, at least the half-life temperature of the polymerization initiator is preferred, and from 30 to 90° C. is more preferred.

(Step (ii))

The solution of the copolymer (A) obtained in step (i) is mixed with an alkali metal hydroxide and water, to convert at least a part of anionic groups in the copolymer (A) to a salt with alkali metal ions derived from the alkali metal hydroxide, thereby to obtain a dispersion of the copolymer (A).

The alkali metal hydroxide and water may be added to the solution of the copolymer (A), or the solution of the copolymer (A) may be added to the alkali metal hydroxide and water. As the alkali metal hydroxide, sodium hydroxide, potassium hydroxide, etc. may be mentioned, and from the viewpoint of the stability of the copolymer (A), sodium hydroxide is preferred.

The molar ratio of the alkali metal hydroxide to anionic groups (alkali metal hydroxide/anionic groups) is from 0.6 to 1.29, more preferably from 0.7 to 1.2, further preferably from 0.7 to 1.1. When the molar ratio is within the above range, the copolymer (A) contained in the liquid repellent composition will not cause precipitation due to poor dispersion or ester hydrolysis due to alkali, and the liquid repellent composition will be excellent in stability.

(Step (iii))

As the method for removing the organic solvent from the dispersion of the copolymer (A), a known method such as stripping (volatilization) treatment, distillation, bubbling, etc. may, for example, be mentioned. In order to increase the removal rate of organic solvent, pressure reduction and heating may be combined. Removal of the organic solvent is conducted, until the proportion of water in the medium wherein the copolymer (A) is dispersed, becomes at least 50 mass %, but preferably at least 60 mass %, more preferably at least 90 mass %, most preferably at least 95 mass %.

(Step (iv))

As the case requires, the above-mentioned other components may be added, or dilution with an aqueous medium, etc. may be made.

As the aqueous medium for dilution, the above-mentioned aqueous medium is preferred and water is more preferred.

Advantageous Effects

In the method for producing a liquid repellent composition of the present invention as described above, the dispersion of the copolymer (A) is obtained by mixing a solution of the copolymer (A) obtained by polymerizing a monomer component comprising the monomer (a) and the monomer (b) in a polymerization medium containing an organic solvent, and an alkali metal hydroxide and water, so that the molar ratio of the alkali metal hydroxide/anionic groups would be from 0.6 to 1.29, thereby to convert at least a part of the anionic groups to a salt, whereby it is possible to produce a liquid repellent composition which is excellent in stability and which is free from a problem due to an amine or an organic amine.

<Treated Article>

By treating a substrate with the liquid repellent composition of the present invention, it is possible to obtain a treated article having liquid repellency imparted.

As the treating method, a method may, for example, be mentioned wherein the liquid repellent composition of the present invention is applied or impregnated to a substrate, and then dried at room temperature or a higher temperature, and as the case requires, heat treatment is conducted. By conducting the drying, heat treatment, etc., it is possible to develop more excellent liquid repellency.

The substrate may be a paper substrate (paper, paperboard, pulp mold, synthetic paper using synthetic fiber as at least a part of the raw material, and related products thereof); woven or nonwoven fabric based on cellulose or regenerated cellulose; woven or nonwoven fabric based on natural or man-made fibers (cotton, cellulose acetate, wool, silk, etc.); woven or nonwoven fabric based on artificial or synthetic fibers (polyamide fibers, polyester fibers, polyolefin fibers, polyurethane fibers, polyacrylonitrile fibers, fluororesin fibers, etc.), or a filter based on such base material; leather, a resin, a plastic material such as a film, glass, wood, metal, concrete, stone, tile, ceramic, brick, painted surface, etc.

As the treated article, from such a viewpoint that the liquid repellent composition of the present invention is suitable for treatment of a paper substrate, preferred is oil resistant paper or oil pulp mold.

Hereinafter, a method for producing oil resistant paper will be described.

<Method for Producing Oil Resistant Paper>

As the method for producing oil resistant paper of the present invention, the following method (α) or method (β) may be mentioned.

Method (α): a method of applying or impregnating the liquid repellent composition of the present invention to a paper substrate (external addition processing).

Method (β): a method of papermaking a pulp slurry having the liquid repellent composition of the present invention added (internal addition processing).

In these production methods, the liquid repellent composition of the present invention may be diluted with water or an aqueous medium. The solid content concentration of the liquid repellent composition to be used in the production methods of the present invention is preferably from 10 to 30 mass %, more preferably from 20 to 25 mass %.

(Method (α))

The paper substrate may be one prepared by subjecting one type of a pulp slurry having pulp dispersed in water alone, or two or more types of such pulp slurries mixed in an optional blend ratio, to beating or addition of reagents, followed by making paper by means of a wire. The shape may be a continuous elongated web-like one, a sheet form one obtained by cutting this, or a molded body (a container, etc.) obtained by a pulp molding machine. The basis weight is not particularly limited, but may be from 10 $g/m^2$ to 500 $g/m^2$.

The raw material of the pulp is not particularly limited, but may be wood such as softwood, hardwood, etc.; herb such as bagasse, rice straw, bamboo, reeds, palm husk, etc.; recycled waste paper, etc. Among the raw materials for pulp, pulp obtained by pulping by using wood or herb is called fresh pulp, and pulp obtained by using waste paper is called recycled pulp. Fresh pulp is called by different names depending on the production method, and as such names, kraft pulp (KP), sulfite pulp (SP), soda pulp, mechanical pulp (MP), thermomechanical pulp (TMP), chemi-thermomechanical pulp (CTMP), etc. may be mentioned. As the fresh pulp, one subjected to single or multiple bleaching treatment may be used, as the case requires. As the recycled pulp, one produced by conducting at least one step among steps of maceration, dust removal, deinking and bleaching, or produced by a combination of a plurality of such steps, may be used as the case requires.

The paper substrate may contain, within a range not to impair the effects of the present invention, a sizing agent, a fixing agent, a dry paper strength agent, a wet paper strength agent, a sulfuric acid band, a retention aid, a dye, a pigment, a filler, etc.

The liquid repellent composition of the present invention may contain a combination agent.

As a combination agent in the external addition processing, a paper strength agent (various starches, resins, etc.), a sizing agent, a penetrating agent, a defoamer, a chelating agent, a dye, a pigment, a dye, a binder, an acid, an alkali, an alginate, aluminum sulfate, etc. may be mentioned.

The application or impregnation of the liquid repellent composition may be carried out at any stage after paper making, and at a size press stage after paper making, wet-press and preceding dryer, or at a stage of using a coater after the size press.

The application of the liquid repellent composition is carried out by a method using a known coating machine.

The coating machine may be a size press machine, a coater, a printing machine, etc.

As the size press machine, a two-roll size press machine, a film transfer size press machine, a calendar size press machine, etc. may be mentioned.

As the coater, a roll coater, an air knife coater, a die coater, a blade coater, a bar coater, a bill blade coater, a short dwell blade coater, etc. may be mentioned.

As the printing machine, a gravure printing machine, a flexographic printing machine, an offset printing machine, etc. may be mentioned.

After applying or impregnating the liquid repellent composition, the paper substrate is dried. The drying method may be a method of drying by heat, or a method of drying without exerting heat (air-drying).

The drying temperature is preferably from 20 to 300° C., more preferably from 20 to 250° C.

(Method (β))

As the raw material for pulp, the above-described one may be mentioned.

The pulp slurry is one having pulp dispersed in water, and it may be prepared by macerating dry pulp by a known maceration machine, or a wet pulp produced by a pulp production equipment may be used by diluting it. One type of a pulp slurry may be used alone, or two or more types of pulp slurries may be used as mixed in an optional blending ratio.

The concentration of pulp in the pulp slurry is preferably from 0.1 to 10 mass %.

The addition of the liquid repellent composition of the present invention may be carried out at any stage before supplying the pulp slurry onto the wire of a paper machine.

To the pulp slurry, a combination agent may be added.

As a combination agent in the internal addition processing, for example, a coagulant, a retention aid, a sizing agent, a paper strength agent, a pigment, a dye, a pH adjusting agent, etc. may be mentioned.

Papermaking of a pulp slurry can be carried out by a method using a known paper machine.

The paper machine may be any device capable of dehydrating a pulp slurry on the wire. The paper machine includes, in the category, in addition to a continuous paper machine such as a Fourdrinier machine, a batch type pulp molding machine in which a pulp slurry is dehydrated by using a molding frame formed by a wire to produce a molded body.

Advantageous Effects

In the method for producing oil resistant paper of the present invention as described above, the liquid repellent composition of the present invention is used whereby it is possible to obtain a treated article excellent in liquid repellency, and which is excellent in stability and has no problem due to ammonia or an organic amine, and thus, it is possible to produce oil resistant paper which is excellent in oil resistance, has no unevenness in oil resistance, and has no problem due to ammonia or an organic amine.

EXAMPLES

In the following, the present invention will be described in detail with reference to Examples, but the present invention is not limited thereto.

Ex. 1 to 3 are Examples of the present invention, and Ex. 4 to 7 are Comparative Examples.

(Mass Average Molecular Weight)

The mass average molecular weight of a copolymer was measured under the following conditions.

Apparatus: manufactured by Tosoh Corporation, HLC-8320GPC,

Column: manufactured by Tosoh Corporation, PL gel MIXED-C×2,

Mobile phase: HCFC-225 (manufactured by Asahi Glass Company, Limited, ASAHIKLIN (registered trademark) AK-225)/tetrahydrofuran/1,1,1,3,3,3-hexafluoro-2-propanol=50/40/10 vol %, Flow rate: 1.0 mL/min, Oven temperature: 37° C., System temperature: 37° C., Concentration of sample: 0.5 mass %, Injection amount: 100 μL, Detector: RI, Molecular weight standards: polymethyl methacrylate (Mp=2,136,000, 1,048,000, 569,000, 332,800, 121,600, 67,400, 30,620, 13,300, 7,360, and 1,950).

(Average Particle Size)

With respect to a sample diluted by adding distilled water to a liquid repellent composition to a solid content concentration of 5 mass %, using a dynamic light scattering photometer (manufactured by Otsuka Electronics Co., Ltd., ELS-Z2), the scattering intensity of the sample was measured under the conditions of temperature: 25° C., number of integration: 70 times, refractive index of the solvent: 1.3313, viscosity of the solvent: 0.8852cp, scattering intensity: 19,344 (ND 24.38%), and from the obtained autocorrelation function, the average particle size of the copolymer in the liquid repellent composition was calculated by a cumulant method analysis.

(Molar Ratio of Alkali Metal Ions/Anionic Groups)

The molar ratio of alkali metal ions in a liquid repellent composition to anionic groups (alkali metal ions/anionic groups) was calculated by the following formula, from the number of moles of structural units based on monomer (b) having an anionic group in the copolymer, and the number of moles of sodium hydroxide, used at the time of producing the liquid repellent composition.

Molar ratio of alkali metal ions in liquid repellent composition to anionic groups (alkali metal ions/anionic groups)=(number of moles of alkali metal hydroxide)/(number of moles of structural units based on monomer ($b$)×number of anionic groups in monomer ($b$)×valence of anionic groups)

(pH)

The pH of a liquid repellent composition prepared to have a solid content concentration of 20 mass %, was measured by using glass electrodes.

(Stability)

The stability of a liquid repellent composition was evaluated by the following three methods. One which was ○ (good) in all of the evaluations, was judged to be ○ as a comprehensive evaluation, and one which was x (bad) even in one of the three evaluations, was judged to be x as a comprehensive evaluation.

(1) Standing Stability:

100 mL of a liquid repellent composition prepared to have a solid content concentration of 20 mass % by adding deionized water, was put in a transparent glass sample bottle with a volume of 110 mL and left to stand still for 3 days at room temperature, whereby the presence or absence of precipitation or agglomeration was visually confirmed and was evaluated by the following standards.

○ (excellent): there is no precipitation and agglomeration.

x (bad): there is precipitation or agglomeration.

(2) Centrifugal Stability:

With respect to a liquid repellent composition prepared to have a solid content concentration of 20 mass % by adding deionized water, using a centrifuge (manufactured by KOKUSAN Co., Ltd., H-19FMR), centrifugal treatment was conducted for 30 minutes under conditions of 25° C. and 3,000 rpm, whereupon the appearance was inspected and evaluated by the following standards.

○ (good): there is no precipitation and agglomeration.

x (bad): there is precipitation or agglomeration.

(3) Hydrolytic Stability

Upon expiration of at least 30 days from the production of a liquid repellent composition, the presence or absence of hydrolysis of the copolymer was confirmed by using GC and evaluated by the following standards.

○ (good): hydrolysis was not confirmed.

x (bad): hydrolysis was confirmed.

(Foaming)

Foaming of a liquid repellent composition was evaluated by the following standards, by measuring the defoaming property parameter based on the above-described defoaming test method α.

○ (good): defoaming property parameter is at most 500 mL.

x (bad): defoaming property parameter exceeds 500 mL.

(Oil Resistance)

A kit test was conducted by the following method in accordance with the TAPPI T559 cm-02 method. In the test, a test solution having castor oil, toluene and n-heptane mixed at a volume ratio shown in Table 1 was used. The results of the test are expressed by a kit No., and the larger the kit No., the better the oil resistance. In the kit test, the oil resistance of test paper can be known in a short time (approximately 20 seconds), and therefore, it is widely used to evaluate the oil resistance of paper. The evaluation result has a meaning as an indicator for the surface tension of the paper.

The test paper was placed on an unstained flat black surface, one droplet of a test solution of kit No. 12 was dropped from a height of 13 mm on the test paper. After 15 seconds from the dropping (contact time: 15 seconds), the dropped test solution was removed with clean blotting paper, and the surface of the test paper which was in contact with the test solution was visually observed. If the color of the surface was found to be darker, the same operation was conducted by using the test solution of kit No. 11, and the same operation was repeated while sequentially reducing the kit No. until a kit No. at which the color of the surface did not become dark. The oil resistance was evaluated by the first (largest) kit No. at which the color of the surface did not become dark.

TABLE 1

| Kit No. | Mixed ratio (vol %) | | |
|---|---|---|---|
| | Castor oil | Toluene | n-Heptane |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

Abbreviations

C6FA: $C_6F_{13}C_2H_4OC(O)CH=CH_2$,

C6FMA: $C_6F_{13}C_2H_4OC(O)C(CH_3)=CH_2$,

HEMA: 2-hydroxyethyl methacrylate (but containing 2% of diethylene glycol methacrylate), HEA: 2-hydroxyethyl acrylate (but containing 2% of diethylene glycol acrylate)

PEGA: polyethylene glycol acrylate (provided that the average value of the number of ethylene oxide units is about 4.5), AA: acrylic acid, MA: methacrylic acid, IA: itaconic acid, V601: dimethyl 2,2'-azobis(2-methylpropionate) (manufactured by Wako Pure Chemical Industries, Ltd., V-601), MEK: methyl ethyl ketone.

Ex. 1 to 7

Step (i):

Into a glass ampule container with a volume of approximately 120 mL, monomers and a polymerization initiator in the proportions as shown in Table 2 (total: 20 g), and acetone or MEK as an organic solvent were charged so that the solid content concentration would be as shown in Table 2; nitrogen replacement was repeated 3 times, and the container was sealed with a rubber stopper. This was mounted on a shaking constant temperature bath heated to a polymerization temperature as shown in Table 2, and by setting the number of shaking times to be 110 times per minute, polymerization was conducted for 20 hours, to obtain an acetone solution of a copolymer.

Step (ii):

Sodium hydroxide in such an amount that the molar ratio of alkali metal ions/anionic groups would be as shown in Table 2, was dissolved in 135 g of water, to prepare an aqueous sodium hydroxide solution. The acetone solution of the copolymer and the aqueous sodium hydroxide solution were mixed and stirred to obtain a dispersion of the copolymer. However, in Ex. 4, because of precipitation, a dispersion of the copolymer was not obtained.

Steps (iii) to (iv):

The acetone and water were distilled off from the dispersion of the copolymer by using an evaporator, and ion-exchanged water was added to obtain a liquid repellent composition with a solid content concentration of 20 mass %. The mass average molecular weight and average particle size of the copolymer, as well as the molar ratio of alkali metal ions/anionic groups in the liquid repellent composition, and the pH, were obtained. The stability and foaming of the liquid repellent composition were also evaluated. The results are shown in Table 2.

Production of Oil Resistant Paper:

Commercial LBKP (hardwood bleached kraft pulp) and NBKP (softwood bleached kraft pulp) were mixed in a mass ratio of 6:4, and water was added so that the pulp concentration became 1 mass %, followed by producing a pulp slurry by using a laboratory macerating machine. Using a 100 mesh wire (a wire mesh with the number of holes being 100 per inch), the mixture was concentrated until the pulp concentration became 10 mass %, and using a PFI mill (laboratory refiner), it was beaten to a freeness of 400 CSF. It was again diluted with water until the pulp concentration became 1 mass % and macerated for one minute by a laboratory macerating machine. While stirring this pulp slurry, a papermaking coagulant (manufactured by Katayama Nalco Inc., N7607) was added to the pulp slurry so as to be 0.4 mass % (as a reagent solid content) relative to the dry mass of pulp, and then, stirring was further continued for 3 minutes, whereupon the liquid repellent composition was added in an amount of 0.5 mass % (as solid content) relative to the dry mass of pulp, and stirring was further continued for an additional 3 minutes. This pulp slurry was sheeted into paper by using a TAPPI standard handsheeting machine so that the basis weight would be 50 g/m². The sheeted wet paper was, in accordance with JIS P8222, couched (dehydrated) and pressed (dehydrated) and then dried at 100° C. for 60 seconds by using a cylinder dryer, to obtain oil resistant paper. After humidifying this oil resistant paper in a standard state, the oil resistance was evaluated. The results are shown in Table 2.

This application is a continuation of PCT Application No. PCT/JP2017/016602, filed on Apr. 26, 2017, which is based upon and claims the benefit of priority from Japanese Patent Application No. 2016-089101 filed on Apr. 27, 2016. The contents of those applications are incorporated herein by reference in their entireties.

What is claimed is:

1. A liquid repellent composition comprising a copolymer (A) having structural units based on a monomer (a) represented by the following formula (I) and structural units based on a monomer (b) having an anionic group and an ethylenically unsaturated double bond, alkali metal ions, and an aqueous medium, wherein the mass average molecular weight of the copolymer (A) is at most 84,000,
at least some of counterions to anionic groups, are alkali metal ions,
the molar ratio of alkali metal ions in the liquid repellent composition to the anionic groups (alkali metal ions/anionic groups) is from 0.6 to 1.29, and
the copolymer (A) is in the form of particles having an average particle size of from 40 to 250 nm, $$R^F\text{-}Q\text{-}X\text{---}C(O)C(R)\text{=}CH_2 \qquad (I)$$

where $R^F$ is a $C_{4-6}$ perfluoroalkyl group, Q is a divalent organic group having no fluorine atom, X is —O— or NH—, and R is a hydrogen atom, a methyl group or a chlorine atom.

2. The liquid repellent composition according to claim 1, wherein in 100 mass % of all structural units in the copolymer (A), the proportion of structural units based on the monomer (a) is from 30 to 99 mass %, and the proportion of structural units based on the monomer (b) is from 1 to 50 mass %.

3. The liquid repellent composition according to claim 1, wherein R in the formula (I) is a methyl group.

4. The liquid repellent composition according to claim 1, wherein the anionic group of monomer (b) is a carboxy group.

TABLE 2

| Charges [parts by mass] | | Ex. 1 | Ex. 2 | Ex. 3 | Ex. 4 | Ex. 5 | Ex. 6 | Ex. 7 |
|---|---|---|---|---|---|---|---|---|
| Monomer (a) | C6FA | — | — | — | — | — | — | 74 |
| | C6FMA | 77 | 77 | 77 | 77 | 77 | 77 | — |
| Monomer (b) | AA | 7.5 | 7.5 | 7.5 | 7.5 | 7.5 | — | — |
| | MA | — | — | — | — | — | 7.5 | 5 |
| | IA | — | — | 2.5 | — | — | 2.5 | — |
| Monomer (c) | HEMA | 15.5 | 15.5 | — | 15.5 | 15.5 | 13 | 16 |
| | HEA | — | — | 13 | — | — | — | — |
| | PEGA | — | — | — | — | — | — | 5 |
| Polymerization initiator | V601 | 0.8 | 0.8 | 0.8 | 0.8 | 0.8 | 0.8 | 0.8 |
| | 4,4'-azobis(4-cyanovaleric acid) | — | — | — | — | — | — | 0.8 |
| Organic solvent | | Acetone | Acetone | Acetone | Acetone | Acetone | Acetone | MEK |
| Polymerization temperature (° C.) | | 75 | 71 | 75 | 75 | 75 | 65 | 65 |
| Monomer/(monomer + organic solvent) [mass %] | | 35 | 35 | 35 | 35 | 35 | 45 | 45 |
| Solid content concentration of liquid repellent composition [mass %] | | 25 | 25 | 25 | 25 | 25 | 20 | 20 |
| Mass average molecular weight [×1,000] | | 70 | 82 | 83 | 70 | 70 | 85 | 120 |
| Average particle size [nm] | | 67 | 83 | 65 | Not measurable | 60 | 32 | 262 |
| Alkali metal ions/anionic groups [molecular ratio] | | 1 | 1 | 1.25 | 0.5 | 1.3 | 0.9 | 1 |
| pH | | 8 | 8 | 10.3 | Not measurable | 12.9 | 8.7 | 8.9 |
| Stability | | ○ | ○ | ○ | Impossible to evaluate | x | ○ | x |
| Foaming | | ○ | ○ | ○ | Impossible to evaluate | ○ | ○ | x |
| Oil resistance (0.5 mass % of liquid repellent composition) | | 4 | 4 | 3 | Impossible to evaluate | 2 | 2 | 4 |

In the liquid repellent compositions in Ex. 1 to 3, the mass average molecular weight of the copolymer was at most 84,000, and the molar ratio of alkali metal ions/anionic groups was from 0.6 to 1.29, whereby the stability of the liquid repellent composition and the oil resistance of the oil resistant paper were excellent.

In the liquid repellent composition in Ex. 4, the molar ratio of alkali metal ions/anionic groups was less than 0.6, whereby the stability of the liquid repellent composition was inferior.

In the liquid repellent composition in Ex. 5, the molar ratio of alkali metal ions/anionic groups was more than 1.29, whereby the stability of the liquid repellent composition and the oil resistance of the oil resistant paper were inferior.

In the liquid repellent composition in Ex. 6, the mass average molecular weight of the copolymer exceeded 84,000, whereby the oil resistance of the oil resistant paper was inferior.

In the liquid repellent composition in Ex. 7, the mass average molecular weight of the copolymer exceeded 84,000, whereby the stability of the liquid repellent composition was inferior.

INDUSTRIAL APPLICABILITY

The liquid repellent composition of the present invention is useful as one to impart liquid repellency to a substrate such as a paper substrate. Further, the oil resistant paper of the present invention is useful for food packaging containers, food packaging paper, etc.

5. The liquid repellent composition according to claim 4, wherein the monomer (b) is (meth)acrylic acid.

6. The liquid repellent composition according to claim 1, wherein the copolymer (A) further has structural units based on a monomer (c) represented by the following formula (II),

$$CH_2\!=\!C(R^1)\text{-}G\text{-}(R^2O)_q\!-\!R^3 \qquad (II)$$

where $R^1$ is a hydrogen atom or a methyl group, $R^2$ is a $C_{2\text{-}4}$ alkylene group, or a $C_{2\text{-}3}$ alkylene group having some or all of hydrogen atoms are substituted by hydroxy groups, q is from 1.00 to 50.00, G is —C(O)O(CH$_2$)$_r$— or C(O)O(CH$_2$)$_t$—NHC(O)O— (where r is an integer of from 0 to 4, and t is an integer of from 1 to 4), and $R^3$ is a hydrogen atom, a methyl group, a (meth)acryloyl group or an allyl group.

7. The liquid repellent composition according to claim 6, wherein the copolymer (A) is composed solely of structural units based on the monomer (a), structural units based on the monomer (b) and structural units based on the monomer (c).

8. The liquid repellent composition according to claim 6, wherein at least one of the monomer (b) and the monomer (c) has an acryloyl group as a moiety having an ethylenically unsaturated double bond.

9. The liquid repellent composition according to claim 1, which does not contain ammonia and an organic amine.

10. A method for producing the liquid repellent composition according to claim 1, comprising
polymerizing monomers comprising the monomer (a), and the monomer (b) in a polymerization medium comprising an organic solvent, to obtain a solution of a copolymer (A),
mixing the solution of the copolymer (A), an alkali metal hydroxide and water, to convert at least a part of anionic groups in the copolymer (A) to a salt to obtain a dispersion of the copolymer (A), and
removing at least a part of the organic solvent from the dispersion of the copolymer (A).

11. The production method according to claim 10, wherein the polymerization to obtain the copolymer (A) is conducted in the absence of a surfactant.

12. A method for producing oil resistant paper, comprising applying or impregnating the liquid repellent composition according to claim 1 to a paper substrate.

13. A method for producing oil resistant paper, comprising papermaking a pulp slurry containing the liquid repellent composition according to claim 1.

* * * * *